US012699407B2

(12) United States Patent
Chung et al.

(10) Patent No.: US 12,699,407 B2
(45) Date of Patent: Aug. 4, 2026

(54) ELECTRONIC APPARATUS FOR IDENTIFYING AN OPERATING STATE OF A ROBOT DEVICE AND CONTROLLING METHOD THEREOF

(71) Applicant: SAMSUNG ELECTRONICS CO., LTD., Suwon-si (KR)

(72) Inventors: Seongwook Chung, Suwon-si (KR); Chungyong Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 18/531,165

(22) Filed: Dec. 6, 2023

(65) Prior Publication Data

US 2024/0111312 A1 Apr. 4, 2024

Related U.S. Application Data

(63) Continuation of application No. PCT/KR2023/011689, filed on Aug. 8, 2023.

(30) Foreign Application Priority Data

Sep. 23, 2022 (KR) ........................ 10-2022-0121029

(51) Int. Cl.
  *G05D 1/86* (2024.01)
  *G05D 1/243* (2024.01)
  (Continued)
(52) U.S. Cl.
  CPC .............. *G05D 1/86* (2024.01); *G05D 1/243* (2024.01); *G05D 1/622* (2024.01);
  (Continued)

(58) Field of Classification Search
  CPC . G06F 21/554; G05D 1/12; G05D 1/02; B25J 9/1674; B25J 15/0491; G01S 5/16; G06N 3/004
  See application file for complete search history.

(56) References Cited

U.S. PATENT DOCUMENTS 10,819,958 B2  10/2020  Kim et al.
11,520,348 B2  12/2022  Lee
      (Continued)

FOREIGN PATENT DOCUMENTS

JP    2007066086 A  *  3/2007  ............... G05D 1/02
JP    2019-207463 A  12/2019
      (Continued)

OTHER PUBLICATIONS

Eugenio Zuccarelli, "Performance Metrics in Machine Learning—Part 3: Clustering", Towards Data Science, Feb. 1, 2021, 10 pages.
      (Continued)

*Primary Examiner* — Yuri Kan
(74) *Attorney, Agent, or Firm* — Sughrue Mion, PLLC

(57) ABSTRACT

An electronic apparatus is disclosed. The electronic apparatus includes a communication interface including circuitry, a sensor, a memory stored with data including a plurality of movement patterns at a normal operation of a robot device, and at least one processor electrically coupled with the memory, and the at least one processor is configured to obtain a movement pattern of the robot device based on at least one from among a signal strength received from the robot device through the communication interface or sensing data of the sensor, and identify an operating state of the robot device according to the obtained movement patterned based on the data as a normal operation or an abnormal operation.

20 Claims, 14 Drawing Sheets

(51) Int. Cl.

| | |
|---|---|
| *G05D 1/622* | (2024.01) |
| *G05D 105/10* | (2024.01) |
| *G05D 111/20* | (2024.01) |
| *G05D 111/30* | (2024.01) |
| *G06F 18/23213* | (2023.01) |
| *G06N 3/08* | (2023.01) |
| *H04B 17/318* | (2015.01) |

(52) U.S. Cl.
CPC ......... *G06F 18/23213* (2023.01); *G06N 3/08* (2013.01); *H04B 17/318* (2015.01); *G05D 2105/10* (2024.01); *G05D 2111/20* (2024.01); *G05D 2111/30* (2024.01)

(56) References Cited

U.S. PATENT DOCUMENTS

| | | | |
|---|---|---|---|
| 2008/0195566 A1* | 8/2008 | Lee | G06N 3/004 |
| | | | 706/14 |
| 2018/0317725 A1* | 11/2018 | Lee | B25J 15/0491 |
| 2019/0212730 A1 | 7/2019 | Jones et al. | |
| 2019/0384317 A1 | 12/2019 | Lee | |
| 2020/0018819 A1* | 1/2020 | Beck | G01S 5/16 |
| 2020/0033865 A1 | 1/2020 | Mellinger, III et al. | |
| 2020/0230818 A1 | 7/2020 | Lee et al. | |
| 2021/0141374 A1 | 5/2021 | Li et al. | |
| 2021/0178594 A1* | 6/2021 | Kotani | B25J 9/1674 |
| 2021/0271268 A1* | 9/2021 | Wagner | G05D 1/12 |
| 2022/0171988 A1 | 6/2022 | Ma et al. | |

FOREIGN PATENT DOCUMENTS

| | | |
|---|---|---|
| JP | 2020-154718 A | 9/2020 |
| KR | 10-1239532 B1 | 3/2013 |
| KR | 10-2015-0076537 A | 7/2015 |
| KR | 10-2018-0090565 A | 8/2018 |
| KR | 10-2019-0080489 A | 7/2019 |
| KR | 10-2025100 B1 | 9/2019 |
| KR | 10-2119161 B1 | 6/2020 |
| KR | 10-2020-0140628 A | 12/2020 |
| KR | 10-2215569 B1 | 2/2021 |

OTHER PUBLICATIONS

Hyunwoo Lim et al., "DJ68-00846K-00-full_VR9500_EN_EU", Jet Bot, VR50T95 **** Series, Samsung, Dec. 1, 2021, 47 pages.
International Search Report and Written Opinion (PCT/ISA/210 and PCT/ISA/237) dated Dec. 1, 2023, issued by International Searching Authority for International Application No. PCT/KR2023/011689.
Santosh Thoduka et al., "Using Visual Anomaly Detection for Task Execution Monitoring", Jul. 29, 2021, 8 pages, arXiv:2107.14206v1 [cs.RO], XP091018867.
Communication issued on Jun. 23, 2025 by the European Patent Office in European Patent Application No. 23868393.2.

* cited by examiner

100

MOVEMENT PATTERN

NORMAL OPERATION
OR
ABNORMAL OPERATION 100-1    20    200    10

ELECTRONIC APPARATUS FOR IDENTIFYING AN OPERATING STATE OF A ROBOT DEVICE AND CONTROLLING METHOD THEREOF

CROSS-REFERENCE TO RELATED APPLICATION(S)

This application is a bypass continuation of International Application No. PCT/KR2023/011689, filed on Aug. 8, 2023, which is based on and claims priority to Korean Patent Application No. 10-2022-0121029, filed on Sep. 23, 2022, in the Korean Intellectual Property Office, the disclosures of which are incorporated by reference herein in their entireties.

BACKGROUND

1. Field

The disclosure relates to an electronic apparatus and a method of controlling the electronic apparatus, and more particularly to an electronic apparatus that identifies an operating state of a robot device according to a movement pattern of the robot device and a method of controlling the electronic apparatus.

2. Description of Related Art

With recent developments in electronic technology, electronic apparatuses of various types are being developed and distributed to perform various operations. For example, electronic apparatuses may include robot devices of various forms that perform a specific operation by driving within a space such as, for example, and without limitation, serving robots that substitute people in shops, cafes, restaurants, and the like, cleaning robots that automatically clean, by suctioning foreign materials driving one its own without a separate operation of a user, an area to be cleaned, and the like.

However, a robot device that is positioned at a private space, such as within a household, surrounding environment data sensed by the robot device may be data that requires a high level of security, and may be data subject to concerns of an invasion of privacy when leaked outside to the public or accessed by a hacker.

Accordingly, there has been a demand for a method of sensing an abnormal operation of the robot devices and providing feedback by a nearby electronic apparatus when an abnormal access (e.g., hacking) to the robot device has occurred and the robot device is operating abnormally.

SUMMARY

According to an aspect of the disclosure, there is provided an electronic apparatus, including: a communication interface; a sensor; a memory stored with data including a plurality of stored movement patterns corresponding to a normal operation of a robot device; and at least one processor electrically coupled with the memory and configured to: obtain a movement pattern of the robot device based on at least one of a signal strength received from the robot device through the communication interface or sensing data from the sensor, and identify an operating state of the robot device as the normal operation or an abnormal operation based on a comparison between the obtained movement pattern and the plurality of stored movement patterns.

According to another aspect of the disclosure, there is provided a controlling method of an electronic apparatus including a memory storing data including a plurality of movement patterns corresponding to a normal operation of a robot device, the method including: obtaining a movement pattern of the robot device based on at least one of a signal strength received from the robot device or sensing data of a sensor; and identifying an operating state of the robot device as a normal operation or an abnormal operation based on a comparison between the obtained movement pattern and the plurality of stored movement patterns.

BRIEF DESCRIPTION OF DRAWINGS

The above and other aspects, features, and advantages of certain embodiments will be more apparent from the following description taken in conjunction with the accompanying drawings, in which.

DETAILED DESCRIPTION

Figure 1:
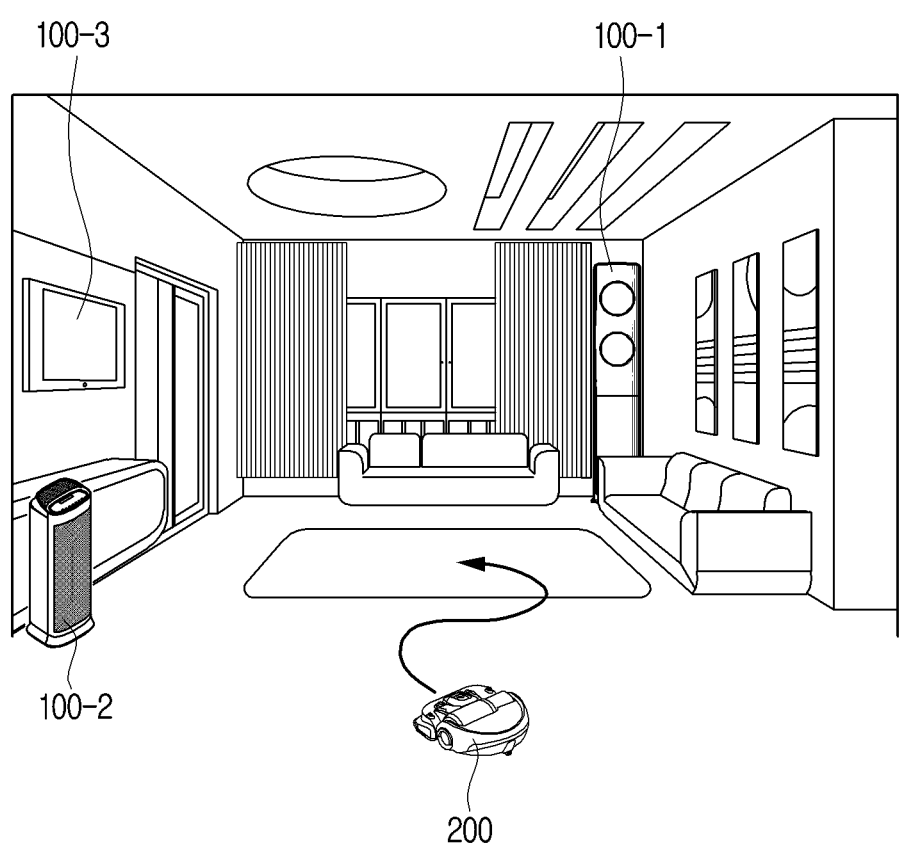
FIG. 1 is a diagram illustrating an electronic apparatus and a robot device according to one or more embodiments.

The disclosure will be described in detail below with reference to the accompanying drawings.

Terms used in describing one or more embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be defined simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B."

Expressions such as "first," "second," "1st," "2nd," and so on used herein may be used to refer to various elements regardless of order and/or importance, and it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in the embodiments herein perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor (not shown).

In this disclosure, the term "user" may refer to a person using an electronic apparatus or a device (e.g., artificial intelligence electronic device) using the electronic apparatus.

One or more embodiments of the disclosure will be described in greater detail below with reference to the accompanied drawings.

FIG. 1 is a diagram illustrating an electronic apparatus and a robot device according to one or more embodiments.

Referring to FIG. 1, a plurality of electronic apparatuses 100-1, 100-2, and 100-3 may be provided within an area, such as a household. For example, the plurality of electronic apparatus may be home appliances of various types that are being developed and supplied to be used by consumers.

For example, each of the electronic apparatuses 100-1, 100-2, and 100-3 may be implemented as internet of things (IoT) devices and may perform communication with one another.

For example, each of the electronic apparatuses 100-1, 100-2, and 100-3 may include an air conditioner 100-1, an air purifier 100-2, a display device 100-3, and the like.

However, this is one example, and an electronic apparatus 100 may be implemented as home appliances of various types. For example, the electronic apparatus 100 may include, in addition to the display device 100-3 which includes displays of various types, at least one from among a user terminal device, a tablet personal computer (PC), a mobile phone, a video phone, an e-book reader, a desktop PC, a laptop PC, a netbook computer, a workstation, a server, a personal digital assistant (PDA), a portable multimedia player (PMP), a MP3 player, a medical device, a camera, a virtual reality (VR) implementation device, or a wearable device. The wearable device may include at least one from among an accessory type (e.g., a watch, a ring, a bracelet, an anklet, a necklace, a pair of glasses, a contact lens or a head-mounted-device (HMD)), a fabric or a garment-embedded type (e.g., an electronic clothing), a skin-attached type (e.g., a skin pad or a tattoo), or a bio-implantable circuit. In one or more embodiments, the electronic apparatus 100 may include at least one from among a television, a digital video disk (DVD) player, an audio, a refrigerator, an air conditioner, a cleaner, an oven, a microwave, a washer, an air purifier, a set top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic frame.

In other embodiments, the electronic apparatus 100 may include at least one from among various medical devices (e.g., various portable medical measurement devices (a glucose measuring device, a heart rate measuring device, a blood pressure measuring device, a temperature measuring device, etc.), a magnetic resonance angiography (MRA), a magnetic resonance imaging (MRI), a computed tomography (CT), an imaging apparatus, an ultrasonic device, etc.), a navigation device, a global navigation satellite system (GNSS)), an event data recorder (EDR), a flight data recorder (FDR), a vehicle infotainment device, a nautical electronic equipment (e.g., nautical navigation device, gyro compass, etc.), an avionics electronic device, a security device, a vehicle head unit, an industrial use or home use robot, a drone, an automated teller machine (ATM) of financial institutions, a point of sales (POS) of shops, or an internet of things device (e.g., a light bulb, various sensors, a sprinkler device, a fire alarm, a thermostat, a street light, a toaster, an exercise equipment, a hot water tank, a heater, a boiler, etc.).

For convenience of description below, the electronic apparatus 100 may be assumed as the air conditioner 100-1, the external electronic apparatus may be assumed as at least one from among the air purifier 100-2 or the display device 100-3, and various examples of the disclosure have been described assumed as embodiments of the air conditioner 100-1, but are not limited thereto, and the various examples of the disclosure may be realized in the above-described home appliances of various types. For example, the various examples may be realized in the air purifier 100-2 and the display device 100-3, respectively. Moreover, electronic apparatus 100 may be referred to as a first electronic apparatus (e.g., the air conditioner 100-1) and the external apparatus may be referred to as a second electronic apparatus (e.g., the air purifier 100-2 or the display device 100-3) different from the first electronic apparatus.

The electronic apparatus 100 according to one or more embodiments may identify a movement pattern of a robot device 200, and identify an operating state of the robot device 200 according to the identified movement pattern as a normal operation or an abnormal operation.

The robot device 200 may refer to a device of various types with a capability of performing one or more functions. For example, the robot device 200 may be a device that performs one or more functions on its own. In an example, the robot device 200 may refer to a smart device that autonomously operates by sensing a surrounding environment of the robot device 200 in real-time and collecting data based on sensing data of a sensor (e.g., a Light Detection And Ranging (LiDAR) sensor, a camera, etc.) in addition to simple repetitive functions.

The robot device 200 according to one or more embodiments may include a driver that includes an actuator or a motor. The driver according to one or more embodiments may include a wheel, a brake, and the like, and the robot device 200 may move on its own within a specific space using the wheel, the brake, and the like included in the driver.

In addition, the robot device 200 may include an articulated robot. Here, the articulated robot may refer to one element of the robot device 200 to substitute a function of an arm or a hand of a human.

The robot device 200 may be classified as an industrial use, a medical use, a home use, a military use, an exploration use, and the like according to a field or a performable function. The industrial use robot device according to one or more embodiments may be divided into a robot device that is used in a product manufacturing process of a factory, a robot device that performs customer reception, order receipt, serving, and the like in a shop or a restaurant, and the like. For example, the robot device 200 may be realized as a serving robot device which can transport a service product to a position desired by a user or to a specific position at various locations such as, for example, and without limitation, a restaurant, a hotel, a supermarket, a hospital, a clothing store, and the like.

However, the above is merely one example, and the robot device 200 may be variously classified according to an application field, a function, and a purpose of use, and is not limited to the above-described example.

For example, as shown in FIG. 1, the robot device 200 may be realized as a robot cleaner positioned within the household. Here, the robot cleaner may refer to a device for automatically suctioning a foreign material driven by electric power. For convenience of description below, the robot device 200 has been assumed as the robot cleaner, and the robot cleaner has been shown assuming that it is realized in a flat form that is closely contacted with the floor to suction foreign materials on the floor, but this is merely one embodiment, and the robot device 200 may be realized in various forms as described above.

For example, because the robot device 200 is configured to sense the surrounding environment of the robot device 200 by being positioned within the household that includes private areas (e.g., bathrooms, bedrooms, dressing rooms, etc.), sensing data (obtained by the robot device 200 sensing the surrounding environment may be data that requires a high level security, and may be data subject to concern for invasion of privacy when leaked to the outside. For example, the sensing data may be a captured image from a camera provided in the robot device 200, and may the capture image may include images from private areas in the house.

For example, if the sensing data of the robot device 200 is leaked to the outside due to an abnormal access to the robot 200, if the robot device 200 moves to a private area (e.g., bathroom, bedroom, dress room, etc.) without authorization, or if the robot device fails to move avoiding objects (e.g., a human, a pet, a wall, a furniture, a home appliance, etc.) within the household, problems may occur, which give rise to inconvenience, anxiety, and other concerns to the user.

Accordingly, the electronic apparatus 100 according to one or more embodiments may identify the movement pattern of the robot device 200, and identify the operating state of the robot device 200 according to the identified movement pattern as the normal operation or the abnormal operation.

In addition, rather than the plurality of electronic apparatuses 100-1, 100-2, and 100-3 positioned within the household respectively identifying the operating state of the robot device 200 by operating independently and separately, the operating state of the robot device 200 may be identified by the plurality of electronic apparatuses 100-1, 100-2, and 100-3 operating organically and cooperatively between one another.

Figure 2:
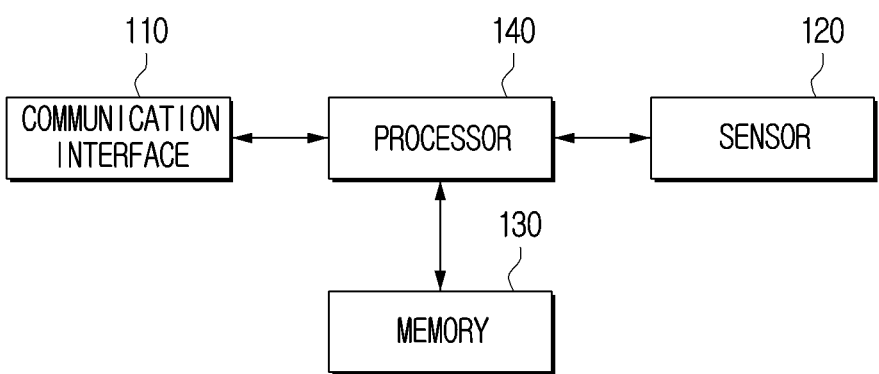
FIG. 2 is a block diagram illustrating a configuration of an electronic apparatus according to one or more embodiments.

FIG. 2 is a block diagram illustrating a configuration of an electronic apparatus according to one or more embodiments.

Referring to FIG. 2, the electronic apparatus 100 according to one or more embodiments may include a communication interface 110, a sensor 120, a memory 130, and at least one processor 140. However, the disclosure is not limited thereto, and as such, other components may be provided in the electronic device 100.

The communication interface 110 according to one or more embodiments may receive input of data of various types and information by performing communication with an external device. For example, the communication interface 110 may receive input of data of various types, information, and the like from, for example, and without limitation, home appliances (e.g., display device, air conditioner, air purifier, etc.), an external storage medium (e.g., USB memory), an external server (e.g., WEBHARD), or the like through a communication method such as, for example, and without limitation, an AP based Wi-Fi (e.g., Wi-Fi, wireless LAN network), Bluetooth, ZigBee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial, or the like.

Specifically, the communication interface 110 according to one or more embodiments may perform communication with the robot device 200. For example, the communication interface 110 may perform a direct communication (e.g., Device-to-Device communication) with the robot device 200 according to control of the at least one processor 140, and identify a signal strength received from the robot device 200.

For example, the communication interface 110 may identify the signal strength received from the robot device 200 by performing direct communication with the robot device 200 using a beacon (a beacon based on Wi-Fi or Bluetooth low energy (BLE)). Here, the signal strength may include a received signal strength indication (RSSI) value.

For example, the RSSI value may be represented in a negative number (dBm, mW unit), and may be represented in a value which is close to 0 as the signal strength intensifies, the RSSI value may be close to 0 as a distance between the electronic apparatus 100 and the robot device 200 becomes shorter, and the RSSI value may be far from 0 as the distance between the electronic apparatus 100 and the robot device 200 becomes farther. The RSSI value according to an example may be represented as a value of 0 (dBm) to −100 (dBm).

As to be described below, the at least one processor 140 may identify the distance between the electronic apparatus 100 and the robot device 200 based on the signal strength. According to an embodiment, the at least one processor 140 may obtain a movement pattern of the robot device 200 based on the identified distance. For example, the at least one processor 140 receive a plurality of distances between the electronic apparatus 100 and the robot device 200, where each of the distances may be correspond to a signal obtained at one of a plurality of time intervals. The plurality of time interval may be periodic or aperiodic. Accordingly, the at least one processor 140 may obtain a movement pattern of the robot device 200 based on the identified plurality of distances.

In addition, the communication interface 110 according to one or more embodiments may perform communication with at least one external electronic apparatus (e.g., air purifier 100-2, display device 100-3) provided within the household.

For example, the communication interface 110 may receive the signal strength (e.g., RSSI value) obtained by the external electronic apparatus from the external electronic apparatus (at least one from among the air purifier 100-2 or the display device 100-3), and receive a distance between the external electronic apparatus and the robot device 200. Further, the at least one processor 140 may obtain a movement pattern of the robot device 200 based on the distance between the electronic apparatus 100 and the robot device 200, and the distance between the external electronic apparatus and the robot device 200 received through the communication interface 110.

According to one or more embodiments, the sensor 120 may obtain sensing data by sensing the surrounding environment of the electronic apparatus 100. According to an embodiment, the sensor 120 may include one or more sensors. Here, the sensing data may include a distance with the robot device 200 adjacent to the electronic apparatus 100, a direction at which the robot device 200 is positioned, a distance with an object adjacent to the electronic apparatus 100, and a characteristic of the object (e.g., a geometric feature, a photometric feature, etc.).

For example, the sensor 120 may include a camera, and the camera may obtain sensing data (e.g., image data) by capturing the surrounding environment of the robot device 200 according to the control of at least one processor 140. The at least one processor 140 may identify the distance between the electronic apparatus 100 and the robot device 200 by analyzing image data. The at least one processor 140 may obtain the movement pattern of the robot device 200 based on the identified distance.

In addition, the communication interface 110 may receive the sensing data (e.g., image data) obtained by the external electronic apparatus from one or more of the external electronic apparatuses (the air purifier 100-2 or the display device 100-3), and receive the distance between the external electronic apparatus and the robot device 200. The at least one processor 140 may obtain a movement pattern of the robot device 200 based on the distance between the electronic apparatus 100 and the robot device 200, and the distance between each of the one or more external electronic apparatuses and the robot device 200 received through the communication interface 110.

According to an example, the electronic apparatus 100 may i) obtain the movement pattern of the robot device 200 based on the distance between the electronic apparatus and the robot device 200, or ii) when the distance between the external electronic apparatus and the robot device 200 is received from the external electronic apparatus, obtain the movement pattern of the robot device 200 based on the distance between the electronic apparatus 100 and the robot device 200, and the distance between the external electronic apparatus and the robot device 200 received from the external electronic apparatus.

In addition, the electronic apparatus 100 may obtain a movement pattern of the robot device 200 based on a signal strength, based on sensing data, or based on the signal strength and the sensing data. However, the disclosure is not limited thereto, and as such, according to another embodiment, the electronic apparatus 100 may obtain the movement pattern via other methods.

The at least one processor 140 may identify the operating state of the robot device 200 according to the obtained movement pattern based on data which includes a plurality of movement patterns corresponding to the normal operation of the robot device 200 stored in the memory 130 as the normal operation or the abnormal operation.

The memory 130 according to an example may store data necessary for the various embodiments of the disclosure. The memory 130 may be realized in a memory form embedded to the electronic apparatus 100 according to data storage use, or realized in a memory form which is attachable to or detachable from the electronic apparatus 100.

For example, data for an operation of the electronic apparatus 100 may be stored in a memory embedded in the electronic apparatus 100, and data for an expansion function of the electronic apparatus 100 may be stored in a memory which is attachable to or detachable from the electronic apparatus 100. The memory embedded in the electronic apparatus 100 may be realized as at least one from among a volatile memory (e.g., a dynamic random access memory (DRAM), a static RAM (SRAM), or a synchronous dynamic RAM (SDRAM)), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). In addition, the memory attachable to or detachable from the electronic apparatus 100 may be realized in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, and the like.

According to an example, the memory 130 may store at least one instruction or a computer program including instructions for controlling the electronic apparatus 100.

The at least one processor 140 according to one or more embodiments may perform an overall control operation of the electronic apparatus 100.

The at least one processor 140 may include at least one from among a central processing unit (CPU), a graphics processing unit (GPU), an accelerated processing unit (APU), a many integrated core (MIC), a digital signal processor (DSP), a neural processing unit (NPU), an hardware accelerator or a machine learning accelerator. The at least one processor 140 may control one from among other elements of the electronic apparatus or a random combination thereof, and perform an operation associated with communication or data processing. The at least one processor 140 may execute at least one program or instruction stored in the memory. For example, the at least one processor 140 may perform a method according to one or more embodiments by executing at least one instruction stored in the memory.

If the method according to one or more embodiments of the disclosure includes a plurality of operations, the plurality of operations may be performed by one processor, or performed by a plurality of processors. For example, when a first operation, a second operation, and a third operation are performed by the method according to one or more embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The at least one processor 140 may be realized as a single core processor that includes one core, or may be realized as at least one multicore processor that includes a plurality of cores (e.g., a homogeneous multicore or a heterogeneous multicore). If the at least one processor 140 is realized as a multicore processor, the plurality of cores included in the multicore processor may respectively include a memory inside the processor such as a cache memory and an on-chip memory, and a common cache shared by the plurality of cores may be included in the multicore processor. In addition, the respective cores included in the multicore processor (or a portion from among the plurality of cores) may independently read and perform program instructions for realizing the method according to one or more embodiments of the disclosure, or read and perform program instructions for realizing the method according to one or more embodiments of the disclosure due to all (or a portion) of the plurality of cores being connected therewith.

If the method according to one or more embodiments include the plurality of operations, the plurality of operations may be performed by one core from among the plurality of cores included in the multicore processor, or performed by the plurality of cores. For example, when the first operation, the second operation, and the third operation are performed by the method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

In the embodiments of the disclosure, the processor may refer to a system on chip (SoC), a single core processor, a multicore processor, or a core included in the single core processor or the multicore processor on which at least one processor and other electronic components are integrated, and the core described herein may be realized as the CPU, the GPU, the APU, the MIC, the DSP, the NPU, the hardware accelerator, the machine learning accelerator, or the like, but the embodiments of the disclosure are not limited thereto.

Specifically, the at least one processor 140 may obtain a movement pattern of the robot device 200, and identify an operating state of the robot device 200 according to the obtained movement pattern based on data stored in the memory 130 to the normal operation or the abnormal operation.

Figure 3:
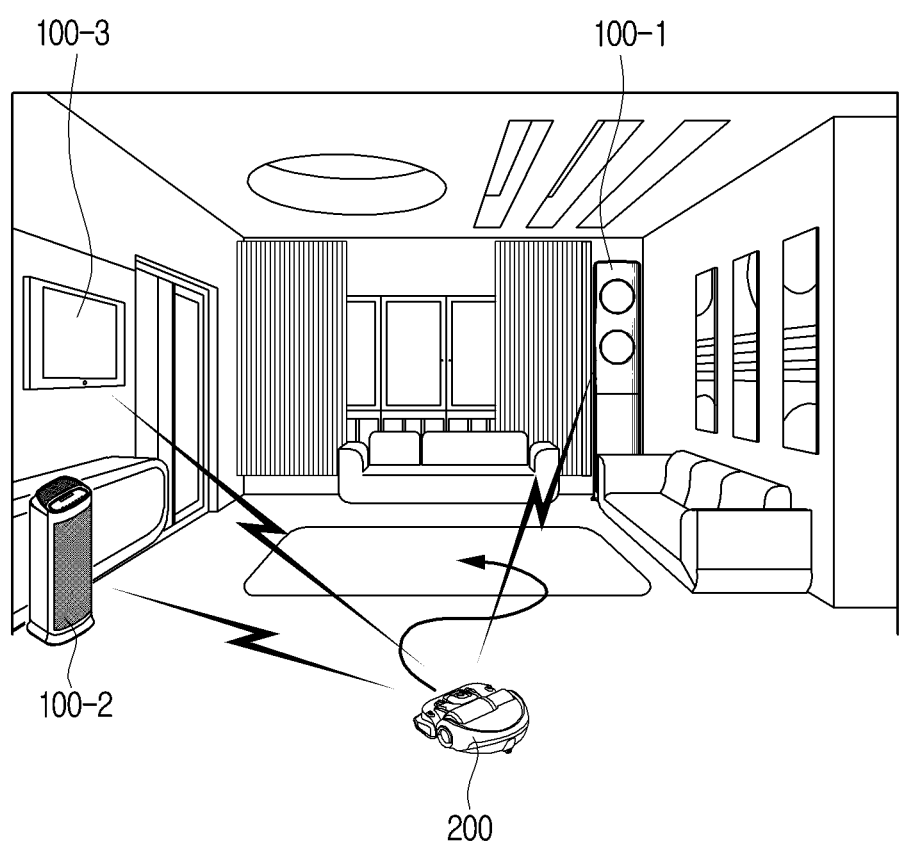
FIG. 3 is a diagram illustrating an electronic apparatus measuring a signal strength according to one or more embodiments.

FIG. 3 is a diagram illustrating an electronic apparatus measuring a signal strength according to one or more embodiments.

Referring to FIG. 3, an example of at least one processor 140 obtaining a movement pattern of a robot device based on a signal strength will be described.

According to one or more embodiments, the air conditioner 100-1 within the household may perform communication with the robot device 200, and identify a first distance between the air conditioner 100-1 and the robot device 200 based on the signal strength received from the robot device 200.

In an example, if the distance between the air conditioner 100-1 and the robot device 200 is 1 km, the RSSI value may be distributed within −49 to −56 dBm, and if the distance between the air conditioner 100-1 and the robot device 200 is 2 m, the RSSI value may be distributed within −59 to −67 dBm. The specific numerical values are merely examples, and are not limited thereto. Accordingly, the at least one processor 140 provided in the air conditioner 100-1 may identify the first distance between the air conditioner 100-1 and the robot device 200 based on the signal strength.

In addition, the air purifier 100-2 within the household may also identify a second distance between the air purifier 100-2 and the robot device 200 based on the signal strength received from the robot device 200, and the display device 100-3 may also identify a third distance between the display device 100-3 and the robot device 200 based on the signal strength received from the robot device 200.

Then, the air conditioner 100-1 may receive the second distance from the air purifier 100-2, and receive the third distance from the display device 100-3.

For example, the plurality of electronic apparatuses 100-1, 100-2, and 100-3 positioned within the household may respectively perform communication with one another. In an example, the electronic apparatus 100 may perform communication with an external electronic apparatus (e.g., air purifier 100-2) through a network device, a server, or the like. Here, the network device may be realized as a device of various types that perform a bridge role such as an access point (AP). For example, the network device may be realized as a router, a switch, an IP router, and a wireless network card.

However, the embodiment is not limited thereto, and the electronic apparatus 100 may perform a peer-to-peer (P2P) communication with an external electronic apparatus. Here, P2P communication may include Bluetooth, a Wi-Fi P2P (or a Wi-Fi Direct), and the like.

According to an embodiment, the air conditioner 100-1 may identify the position of the robot device 200 based on the first distance identified by the air conditioner 100-1, the second distance received from the air purifier 100-2, and the third distance received from the display device 100-3.

For example, the at least one processor 140 provided in the air conditioner 100-1 may identify the position of the robot device 200 according to a trilateration (True-range multilateration) method based on the first distance, the second distance, and the third distance.

For example, the at least one processor 140 may identify the position of the robot device 200 according to the trilateration (True-range multilateration) method based on the position of the air conditioner 100-1 (a first reference point), the position of the air purifier 100-2 (a second reference point), the position of the display device 100-3 (a third reference point), and the first to third distances.

The at least one processor 140 provided in the air conditioner 100-1 may also identify the position of the robot device 200 based on the position of the air conditioner 100-1 (first reference point) and the first distance identified by the air conditioner 100-1.

In addition, the at least one processor 140 may also identify the position of the robot device 200 based on the position of the external electronic apparatus (e.g., air purifier 100-2; second reference point) and the second distance identified by the external electronic apparatus in addition to the position of the electronic apparatus 100 (first reference point) and the first distance identified by the electronic apparatus 100.

According to an embodiment, the at least one processor 140 may identify the change in position of the robot device 200, and obtain a movement pattern of the robot device 200 based on the identified change in position.

Figure 4:
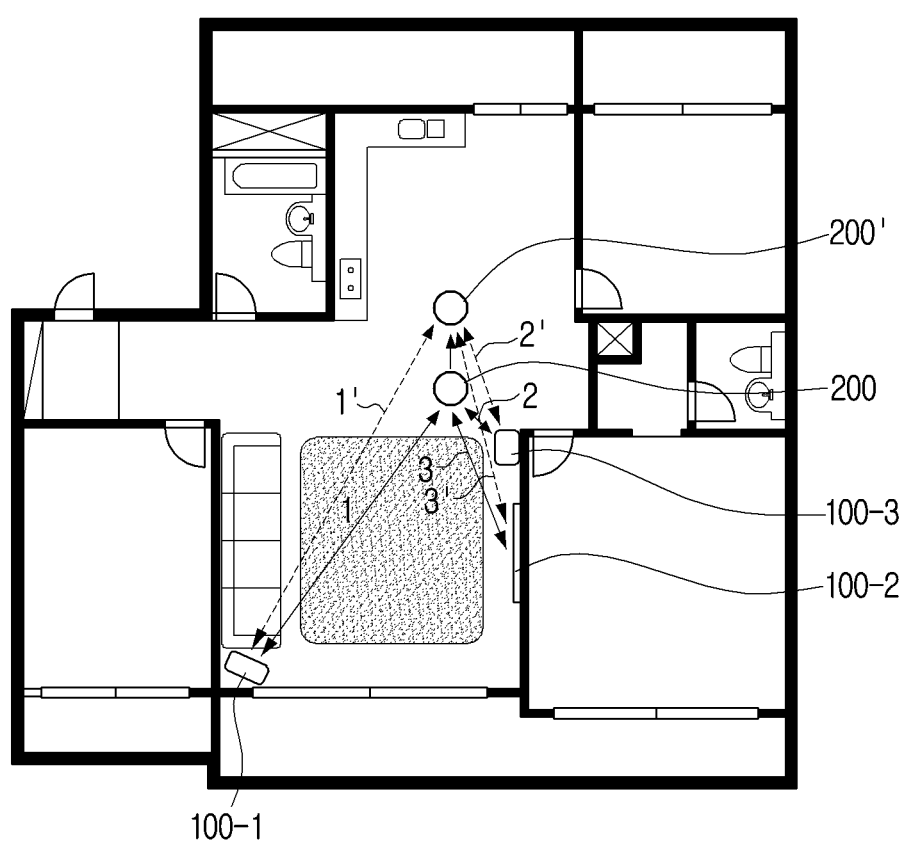
FIG. 4 is a diagram illustrating an electronic apparatus identifying a change in position according to one or more embodiments.

FIG. 4 is a diagram illustrating an electronic apparatus identifying a change in position according to one or more embodiments.

<t Time Point>

As described in FIG. 3, the at least one processor 140 according to one or more embodiments may perform communication with the robot device 200 and identify a first distance 1 between the air conditioner 100-1 and the robot device 200 based on the signal strength received from the robot device 200.

In addition, the air purifier 100-2 within the household may also identify a second distance 2 between the air purifier 100-2 and the robot device 200 based on the signal strength received from the robot device 200, and the display device 100-3 may also identify a third distance 3 between the display device 100-3 and the robot device 200 based on the signal strength received from the robot device 200.

According to an embodiment, the at least one processor 140 may identify the position of the robot device 200 according to the trilateration (True-range multilateration) method based on the position of the air conditioner 100-1 (first reference point), the position of the air purifier 100-2 (second reference point), the position of the display device 100-3 (third reference point), and the first to third distances 1, 2, and 3.

<t+1 Time Point>

The at least one processor 140 according to one or more embodiments may perform communication with a robot device 200' from a t+1 time point by which a certain time has passed from a t time point, and identify a first distance 1' between the air conditioner 100-1 and the robot device 200' based on a signal strength received from the robot device 200'.

In addition, the air purifier 100-2 within the household may also identify a second distance 2' between air purifier 100-2 and the robot device 200' based on the signal strength received from the robot device 200', and the display device 100-3 may also identify a third distance 3' between display device 100-3 and the robot device 200' based on the signal strength received from the robot device 200'.

According to an embodiment, the at least one processor 140 may identify the position of the robot device 200' according to the trilateration (True-range multilateration) method based on the position of the air conditioner 100-1 (first reference point), the position of the air purifier 100-2 (second reference point), the position of the display device 100-3 (third reference point), and the first to third distances 1', 2', and 3'.

Here, a certain time interval of the t time point and the t+1 time point may be a pre-set time interval, and the interval at which the robot device 200 transmits a signal, and the like may be variously set.

The at least one processor 140 according to one or more embodiments may identify the change in position of the robot device 200 based on the position of the robot device 200 identified at the t time point and the position of the robot device 200' identified at the t+1 time point, and obtain a movement pattern of the robot device 200 according to the change in position. Here, the change in position of the robot device 200 may include a change in coordinates (e.g., 2D coordinate change, 3D coordinate change) of the robot device 200 within a space (e.g., within the household) at which the robot device 200 is positioned.

According to an embodiment, the at least one processor 140 may identify the operating state of the robot device 200 as the normal operation or the abnormal operation based on the movement pattern of the robot device 200.

Figure 5:
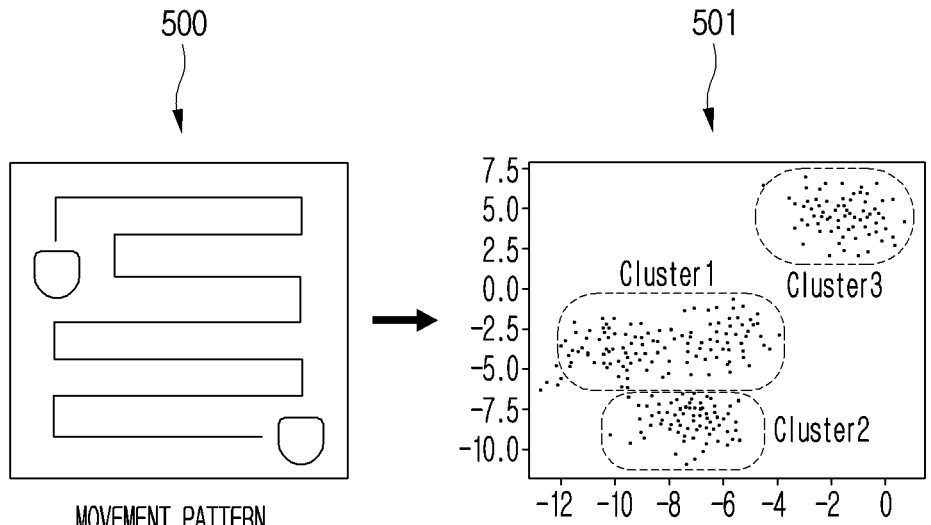
FIG. 5 is a diagram illustrating an electronic apparatus identifying a normal operation and an abnormal operation according to one or more embodiments.
Figure 6:
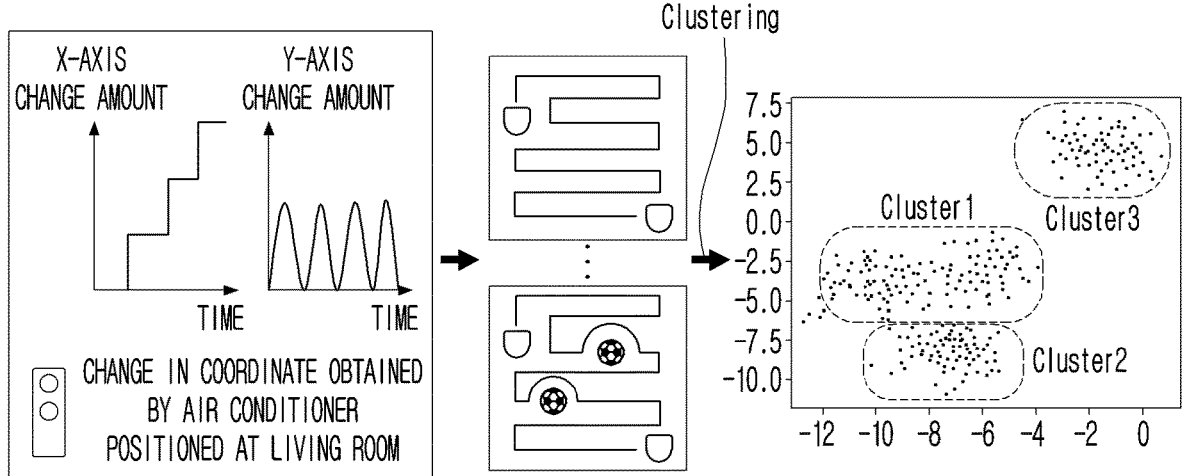
FIG. 6 is a diagram illustrating a method of obtaining a plurality of clusters according to one or more embodiments.

FIG. 5 is a diagram illustrating an electronic apparatus identifying a normal operation and an abnormal operation according to one or more embodiments, and FIG. 6 is a diagram illustrating a method of obtaining a plurality of clusters according to one or more embodiments.

First, referring to FIG. 6, the at least one processor 140 may classify the plurality of movement patterns corresponding to the normal operation of the robot device 200 stored in the memory 130 and obtain a plurality of clusters. For example, the at least one processor 140 may group the plurality of movement patterns corresponding to the normal operation of the robot device 200 stored in the memory 130 and obtain a plurality of groups.

Here, the plurality of movement patterns stored in the memory 130 may include a movement pattern based on a driving history at the normal operation of the robot device 200, a movement pattern set at a manufacturer of the robot device 200, a movement pattern set by a user of the robot device 200, and the like.

For example, a first cluster from among k number of clusters obtained by classifying the plurality of movement patterns may include a first movement pattern of the robot device 200, a second cluster may include a second movement pattern (of the robot device, and a third cluster may include a third movement pattern (e.g., rotation movement pattern) of the robot device 200. The first movement pattern may be a movement pattern for operating near or following a still object such as wall, furniture, home appliance, etc. The second movement pattern may be a movement pattern for avoiding a moving object (e.g., human, pet). However, the above is merely an example for convenience of description, and is not limited thereto.

The at least one processor 140 according to one or more embodiments may identify a cluster corresponding to an obtained movement pattern from among the plurality of clusters.

Referring to FIG. 5, the at least one processor 140 may identify, based on a cluster corresponding to the obtained movement pattern being identified from among the plurality of clusters, the operating state according to the obtained movement pattern as the normal operation.

In another example, the at least one processor 140 may identify, based on a cluster corresponding to the obtained movement pattern not being identified from among the plurality of clusters, the operating state according to the obtained movement pattern as the abnormal operation.

For example, the at least one processor 140 may compare a cluster corresponding to the moving pattern 500 with one or more clusters in cluster data 501 and determine whether the cluster corresponding to the moving pattern 500 matches any of the one or more clusters in cluster data 501. If the at least one processor 140 determines a match, the at least one processor 140 may determine that the operating state according to the obtained movement pattern as the normal operation. However, if the at least one processor 140 determines that there is no match, the at least one processor 140 may determine that the operating state according to the obtained movement pattern as the abnormal operation.

For example, the at least one processor 140 may output a likelihood of the obtained movement pattern being included in the plurality of clusters, respectively.

In an example, the at least one processor 140 may identify, based on a likelihood of the obtained movement pattern being included in any one cluster from among the plurality of clusters being greater than or equal to a threshold value (e.g., 0.5), the operating state according to the movement pattern as the normal operation because the cluster corresponding to the obtained movement pattern is identified from among the plurality of clusters.

For example, the at least one processor 140 may identify, based on a likelihood of the obtained movement pattern being included in the first cluster being 0.7, a likelihood of being included in the second cluster being 0.1, and a likelihood of being included in the third cluster being 0.2, the operating state of the robot device 200 according to the obtained movement pattern as the normal operation because the obtained movement pattern corresponds to the first cluster (or, is included in the first cluster).

In an example, the at least one processor 140 may identify, based on a likelihood of the obtained movement pattern being included in the plurality of clusters, respectively, being less than the threshold value (e.g., 0.5), the operating state according to the obtained movement pattern as the abnormal operation because the cluster corresponding to the obtained movement pattern is not identified from among the plurality of clusters.

For example, the at least one processor 140 may identify, based on a likelihood of the obtained movement pattern being included in the first cluster being 0.2, a likelihood of being included in the second cluster being 0.1, and a likelihood of being included in the third cluster being 0.3, the operating state of the robot device 200 according to the obtained movement pattern as the abnormal operation because the obtained movement pattern does not correspond to the plurality of clusters, respectively.

The identifying a likelihood of a movement pattern obtained for convenience of description being included in any one cluster from among three clusters (first to third clusters) is an example for convenience of description, and a number of clusters, a distribution of clusters. And the like are not limited to the above-described example.

Figure 7:
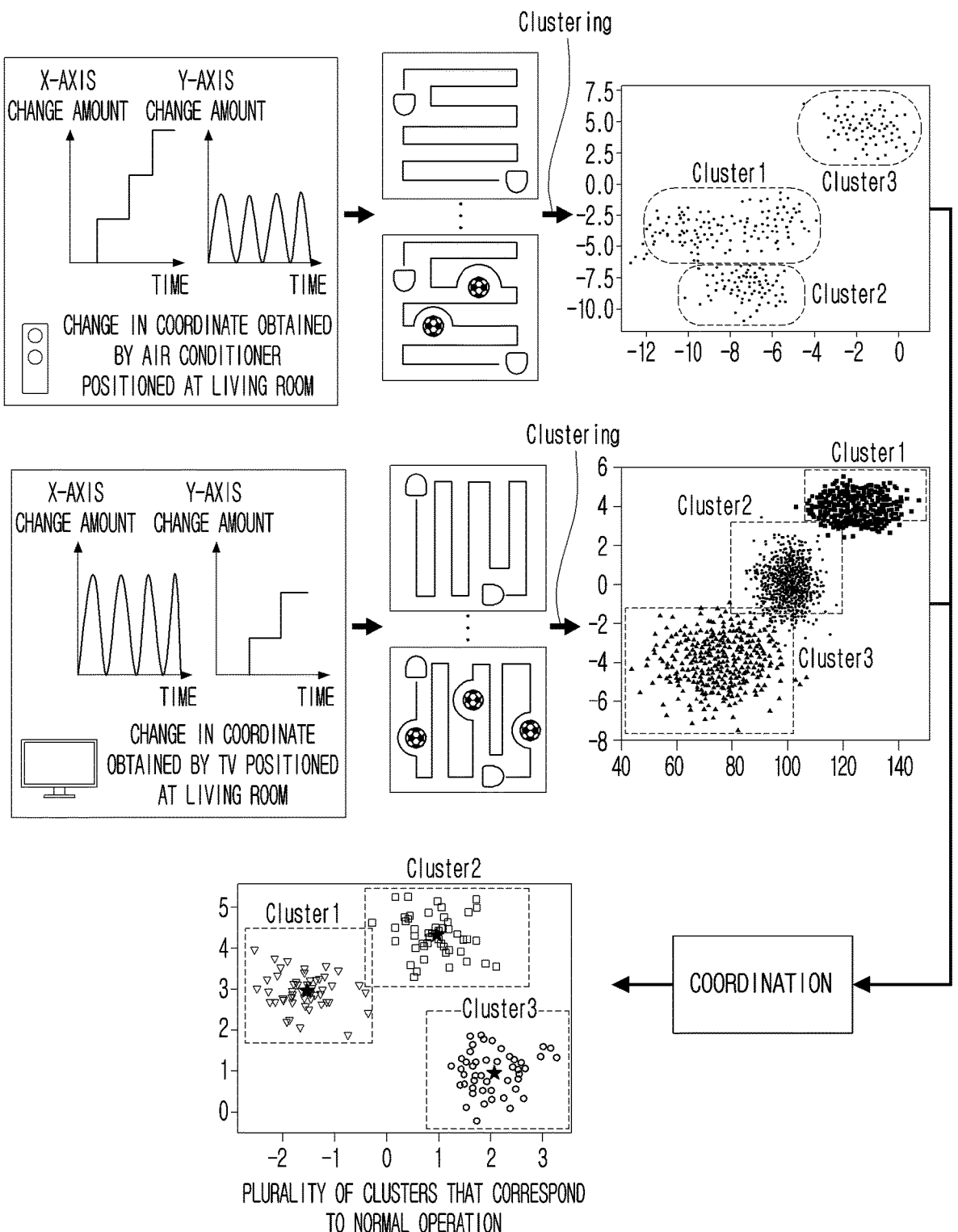
FIG. 7 is a diagram illustrating an electronic apparatus using a plurality of clusters received from an external electronic apparatus according to one or more embodiments.

FIG. 7 is a diagram illustrating an electronic apparatus using a plurality of clusters received from an external electronic apparatus according to one or more embodiments.

The at least one processor 140 according to one or more embodiments may receive the plurality of movement patterns from the external electronic apparatus, and obtain the plurality of clusters that correspond to the normal operation of the robot device 200 by coordinating i) the plurality of movement patterns stored in the memory 130 and ii) the plurality of movement patterns received from the external electronic apparatus.

For example, the at least one processor 140 may coordinate (or organize) i) the plurality of movement patterns obtained by the electronic apparatus 100 and ii) the plurality of movement patterns obtained by the external electronic apparatus and transmitted by the external electronic apparatus to the electronic apparatus 100, and obtain the plurality of clusters that correspond to the normal operation by classifying the coordinated plurality of movement patterns.

In an example, the at least one processor 140 may classify the coordinated plurality of movement patterns for each movement pattern. For example, the at least one processor 140 may classify the coordinated plurality of movement patterns as the plurality of clusters using a K-means Clustering (or, a K-means algorithm).

According to an embodiment, the at least one processor 140 may identify a cohesion C for the respective clusters, and identify a silhouette score S between the plurality of clusters.

According to an embodiment, the at least one processor 140 may identify whether the respective clusters correspond with the movement pattern at the normal operation of the robot device 200 based on the cohesion C and the silhouette score S.

Here, the k number of the clusters may be proportionate with an n number of the plurality of electronic apparatuses 100-1, 100-2, 100-3, . . . , 100-$n$ positioned within the household, and may be inversely proportionate with a p number of electronic apparatuses (e.g., air purifier 100-2, display device 100-3, etc.) positioned within a same space as with the electronic apparatus (e.g., air conditioner 100-1) from among the plurality of electronic apparatuses 100-1, 100-2, 100-3, . . . , 100-$n$ positioned within the household.

In an example, when the at least one processor 140 classifies the coordinated plurality of movement patterns as the plurality of clusters, an optimal k number of clusters may be represented with Equation 1 below.

$$k=N/P*\alpha \qquad \text{[Equation 1]}$$

Here, $\alpha$ represents a correction factor.

In an example, an optimal clustering level which represents whether the plurality of clusters obtained by classifying the coordinated plurality of movement patterns are appropriately classified for each movement pattern may be represented with Equation 2 below.

$$I=C*S*\beta \qquad \text{[Equation 2]}$$

Here, C represents cohesion, S represents silhouette score, and $\beta$ represents a correction factor.

Accordingly, the optimal clustering level may be higher as the cohesion is greater, and the silhouette score is higher. In an example, based on k and I being respectively greater than or equal to a threshold value, the at least one processor 140 may identify that the plurality of clusters obtained by classifying the coordinated plurality of movement patterns have been appropriately classified for each movement pattern and that the plurality of clusters that correspond to the normal operation have been obtained. Here, the threshold value may be updated every time a movement pattern based on the driving history of the robot device 200 is obtained.

According to an embodiment, the at least one processor 140 may identify, based on the cluster corresponding to the obtained movement pattern being identified from among the plurality of clusters that correspond to the normal operation, the operating state according to the obtained movement pattern as the normal operation, and identify, based on the cluster corresponding to the obtained movement pattern not being identified from among the plurality of clusters that correspond to the normal operation, the operating state according to the obtained movement pattern as the abnormal operation.

Figure 8:
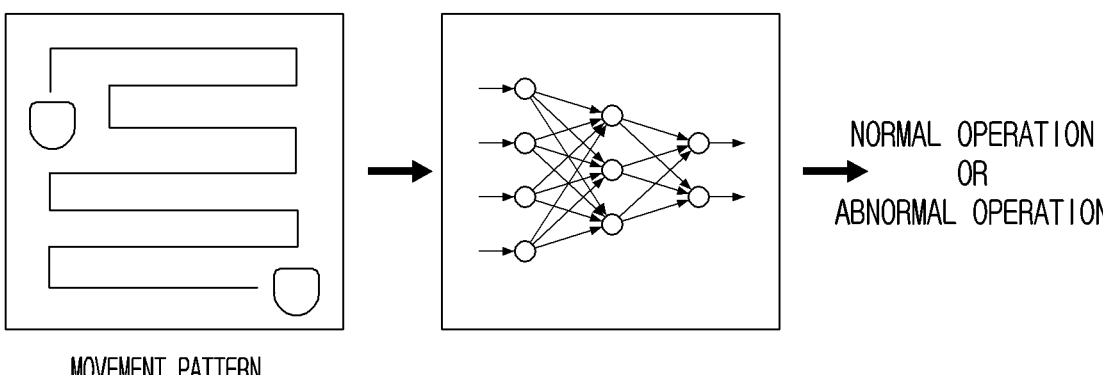
FIG. 8 is a diagram illustrating a neural network model according to one or more embodiments.

FIG. 8 is a diagram illustrating a neural network model according to one or more embodiments.

Referring to FIG. 8, the at least one processor 140 may identify the operating state of the robot device 200 as the normal operation or the abnormal operation by inputting the obtained movement pattern in a neural network model.

In an example, the neural network model may be a model trained to identify, based on the plurality of movement patterns corresponding to the normal operation stored in the memory 130, the operating state of the robot device 200 as the normal operation or the abnormal operation when the obtained movement pattern is input.

In an example, the neural network model may be a model trained to identify the operating state of the robot device 200 as the normal operation or the abnormal operation when the obtained movement pattern is input based on i) the plurality of movement patterns stored in the memory 130 of the electronic apparatus 100 and ii) the plurality of movement patterns obtained by the external electronic apparatus and the plurality of the movement patterns transmitted by the external electronic apparatus to the electronic apparatus 100 being coordinated.

In an example, the neural network model may be a model trained to identify, based on the k according to Equation 1 and the I according to Equation 2 being respectively greater than or equal to the threshold value, the operating state of the robot device 200 the normal operation or the abnormal operation when the obtained movement pattern is input based on the movement pattern included in the respective clusters corresponding to the normal operation.

Functions associated with an artificial intelligence according to the disclosure will be operated through the at least one processor 140 and the memory 130 of the electronic apparatus 100.

The at least one processor 140 may be formed of one or a plurality of processors. At this time, the one or the plurality of processors may include at least one from among a central processing unit (CPU), a graphic processing unit (GPU), and a neural processing unit (NPU), but is not limited to the above-described example of the processor.

The CPU may effectively execute, as a generic purpose processor capable of performing not only generic operations but also artificial intelligence operations, a complex program through a multi-layered cache structure. The CPU may be advantageous in a serial processing method that allows for an organic connection of a previous calculation result and a following calculation result to be possible through a sequential calculation. The generic purpose processor is not limited to the above-described example except for when specified as the above-described CPU.

The GPU may perform, as a processor for large amount operations such as a floating point operation and the like which is used in graphic processing, the large amount operation in parallel by integrating the core in large amounts. Specifically, the GPU may be advantageous in a parallel processing method such as a convolution operation compared to the CPU. In addition, the GPU may be used as a co-processor to supplement the functions of the CPU. The processor for large amount operations is not limited to the above-described example except for when specified as the above-described GPU.

The NPU may be a processor that is specialized in artificial intelligence operations using an artificial neural network, and each layer that forms the artificial neural network may be realized as a hardware (e.g., silicon). At this time, because the NPU is designed specialized according to a required specification of a company, a level of freedom compared to the CPU or the GPU may be low, but the artificial intelligence operation required by the company may be effectively processed. As a processor that is specialized in artificial intelligence operations, the NPU may be realized in various forms such as, for example, and without limitation, a tensor processing unit (TPU), an intelligence processing unit (IPU), a vision processing unit (VPU), and the like. The artificial intelligence processor is not limited to the above-described example except for when specified as the above-described NPU.

In addition, the one or the plurality of processors may be realized as a System on Chip (SoC). At this time, the SoC may further include a memory in addition to the one or the plurality of processors, and a network interface such as a bus for data communication between the processor and the memory.

If the plurality of processors are included in the SoC included in the electronic apparatus 100, the electronic apparatus 100 may perform an operation (e.g., operation associated with learning or inference of the artificial intelligence model) associated with artificial intelligence using a portion of the processors from among the plurality of processors. For example, the electronic apparatus 100 may perform an operation associated with artificial intelligence using at least one from among the GPU, the NPU, the VPU, the TPU, and the hardware accelerator which are specialized in artificial intelligence operations such as a convolution operation and a matrix multiplication operation from among the plurality of processors. However, the above is merely one embodiment, and the operation associated with artificial intelligence may be processed by using a generic purpose processor such as the CPU.

In addition, the electronic apparatus 100 may perform an operation for a function associated with artificial intelligence by using a multicore (e.g., a dual core, a quad core, etc.) included in one processor. Specifically, the electronic apparatus 100 may perform artificial intelligence operations such as the convolution operation and the matrix multiplication operation in parallel by using the multicore included in the at least one processor 140.

The one or the plurality of processors may control to process input data according to a pre-defined operation rule or an artificial intelligence module stored in the memory 130. The pre-defined operation rule or the artificial intelligence model may be characterized by being created through learning.

The being created through learning referred herein refers to a pre-defined operation rule or an artificial intelligence model of a desired feature being created by applying a learning algorithm to a plurality of learning data. The learning may be carried out in the machine itself in which the artificial intelligence according to the disclosure is performed, or carried out through a separate server and/or system.

The artificial intelligence model may be formed of a plurality of neural network layers. At least one layer may include at least one weight value, and perform an operation of a layer through an operation result of a previous layer and at least one pre-defined operation. Examples of the neural network may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, a Transformer, and the like, and the neural network of the disclosure is not limited to the above-described example except for when specified.

The learning algorithm may be a method for training a predetermined target machine (e.g., robot) to make decisions or predictions on its own using the plurality of learning data. Examples of the learning algorithm may include a supervised learning, an unsupervised learning, a semi-supervised learning, or a reinforcement learning, and the learning algorithm of the disclosure is not limited to the above-described example unless otherwise specified.

Figure 9:
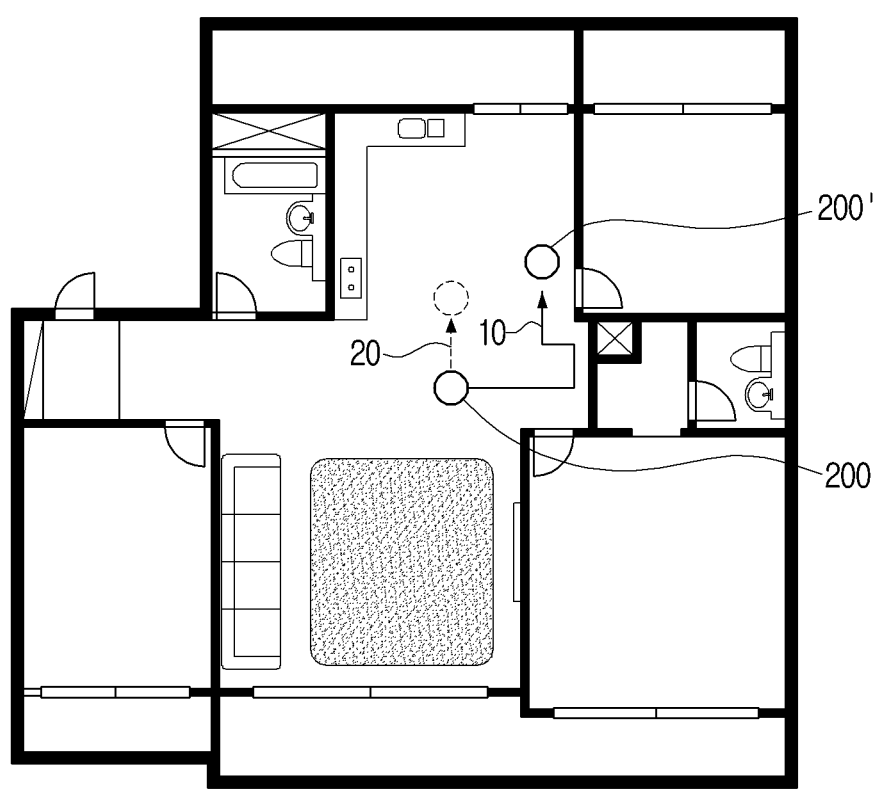
FIG. 9 is a diagram illustrating a normal operation and an abnormal operation according to one or more embodiments.

FIG. 9 is a diagram illustrating a normal operation and an abnormal operation according to one or more embodiments.

At the normal operation of the robot device 200 according to the various embodiments of the disclosure, the robot device 200 may move according to a driving algorithm based on sensing data of a sensor provided in the robot device 200, a user command for the robot device 200, and the like. That is, based on the movement pattern of the robot device 200 corresponding to the driving algorithm of the robot device 200, the operating state of the robot device 200 may be the normal operation.

In another example, based on the movement pattern of the robot device 200 not corresponding to the driving algorithm of the robot device 200, the operating state of the robot device 200 may be the abnormal operation. For example, if the robot device 200 moves according to an abnormal access to the robot device 200 (e.g., a network attack, hacking, etc. of the robot device 200) and not the driving algorithm, the operating state of the robot device may be the abnormal operation because the movement pattern of the robot device 200 does not correspond to the driving algorithm of the robot device 200.

As shown in FIG. 9, when the movement pattern of the robot device 200 at the normal operation is a wall following driving illustrated by arrow 10, the robot device 200 performing straight driving illustrated by 20 may be assumed to be operating in the abnormal operation.

According to an example embodiment, in a case in which the electronic apparatus 100 does not recognize whether an abnormal access to the robot device 200 has occurred, the driving algorithm of the robot device 200, the sensing data of the robot device 200, the user command for the robot device 200, and the like may identify whether the operating state of the robot device 200 is the normal operation or the abnormal operation based on the movement pattern obtained based on the signal strength, the sensing data, and the like.

Figure 10:
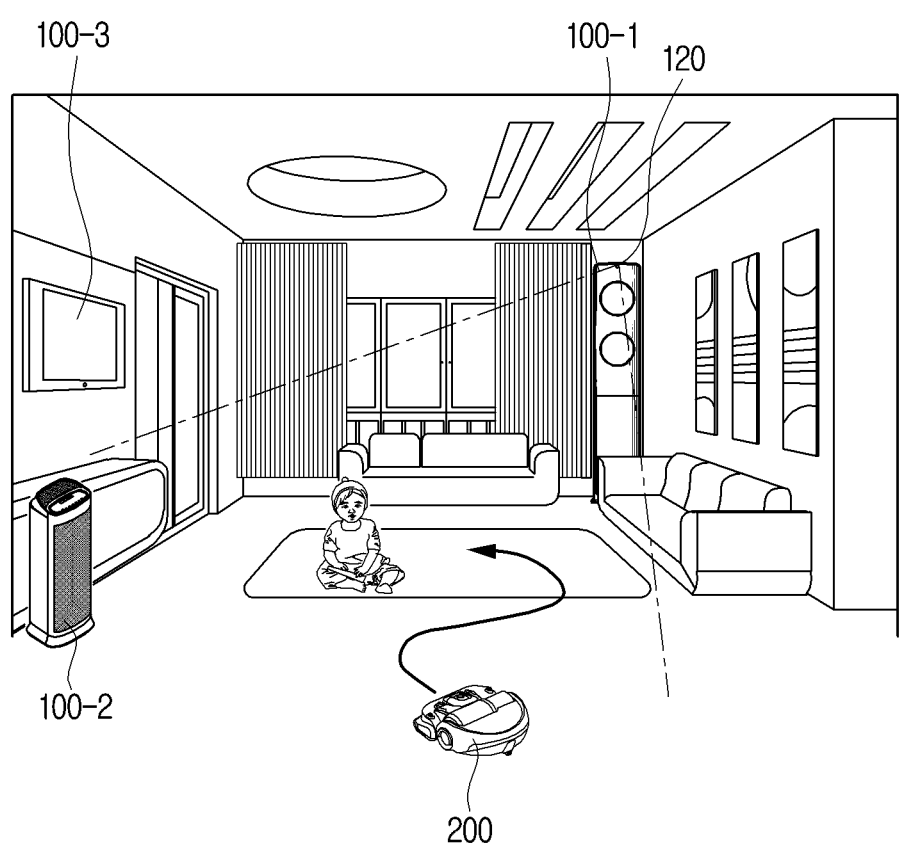
FIG. 10 is a diagram illustrating an electronic apparatus including a camera according to one or more embodiments.

FIG. 10 is a diagram illustrating an electronic apparatus including a camera according to one or more embodiments.

Referring to FIG. 10, the sensor 120 of the electronic apparatus 100 may include a camera.

The at least one processor 140 according to one or more embodiments may obtain a movement pattern of the robot device 200 based on an image (e.g., image data) received from the camera. For example, the at least one processor 140 may obtain a movement pattern of the robot device 200 based on a position of the robot device 200 according to an image received at the t time point and a position of the robot device 200' according to an image received at the t+1 time point.

According to an embodiment, the at least one processor 140 may identify the normal operation or the abnormal operation according to whether the cluster corresponding to the obtained movement pattern is identified from among the plurality of clusters or an output of the neural network model when the movement pattern is input to the neural network model.

Figure 11:
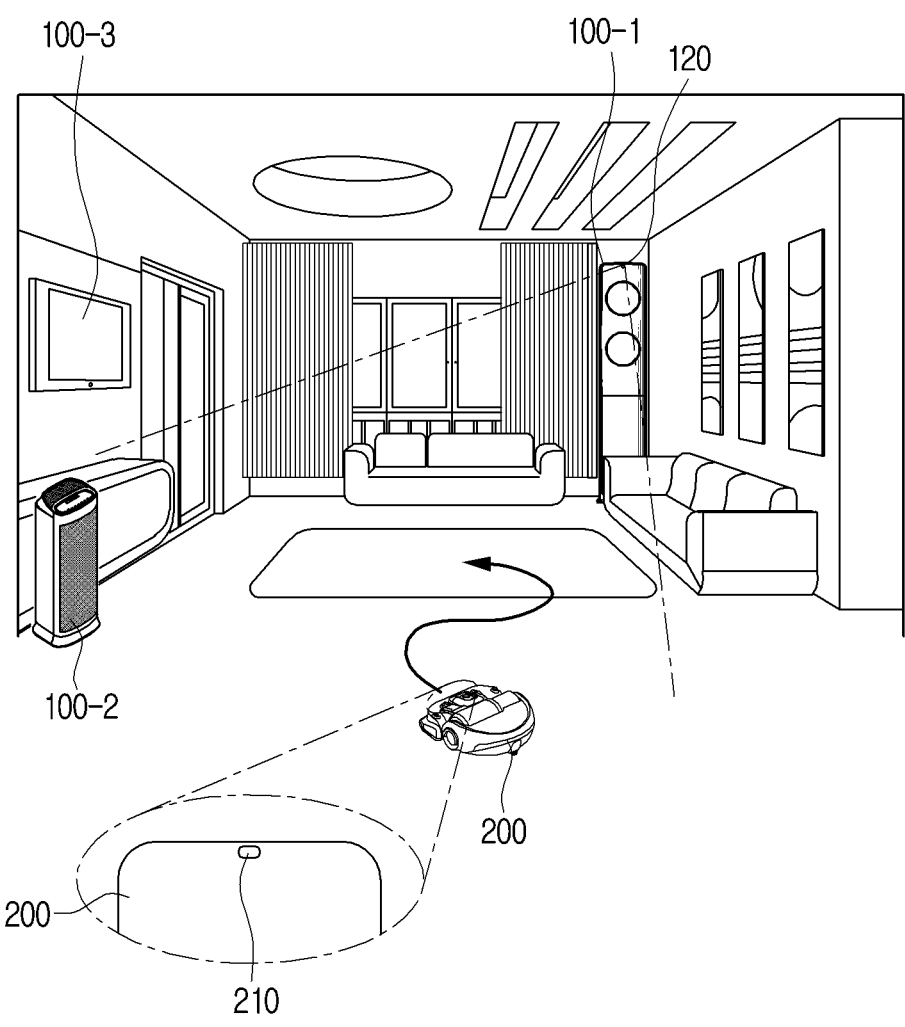
FIG. 11 is a diagram illustrating an electronic apparatus identifying an operating state of an electronic apparatus using a camera according to one or more embodiments.

FIG. 11 is a diagram illustrating an electronic apparatus identifying an operating state of an electronic apparatus using a camera according to one or more embodiments.

Referring to FIG. 11, the robot device 200 may include a display 210 for providing the operating state of the robot device 200.

For example, the display 210 may display a first color (e.g., red) based on the operating state of the robot device 200 being the abnormal operation such as driving of the robot device 200 not being possible, power being discharged, failure, and the like. In another example, the display 210 may display a second color (e.g., green) when the operating state of the robot device 200 is the normal operation.

Here, the display 210 may be realized as an LED, and the like (e.g., an operating state indicating light).

The at least one processor 140 according to an example may identify, based on the display provided in the robot device 200 being identified as displaying the first color based on an image, the operating state as the abnormal operation.

In another example, the at least one processor 140 may identify, based on the display provided in the robot device 200 being identified as displaying the second color based on an image, the operating state as the normal operation.

Figure 12:
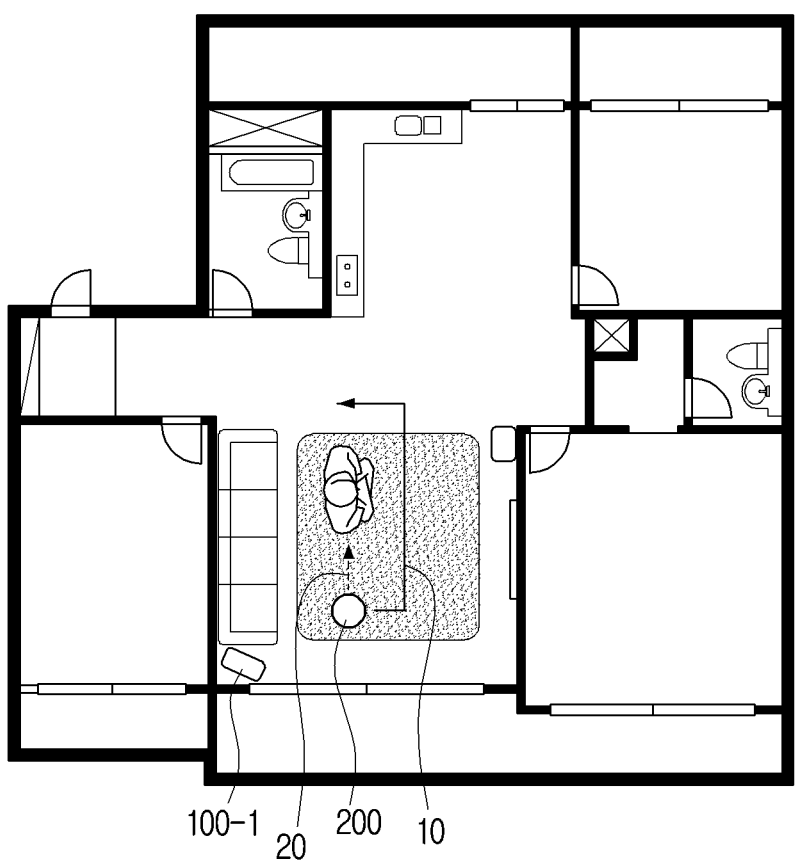
FIG. 12 is a diagram illustrating an electronic apparatus identifying an operating state of a robot device avoiding an object according to one or more embodiments.

FIG. 12 is a diagram illustrating an electronic apparatus identifying an operating state of a robot device avoiding an object according to one or more embodiments.

The at least one processor 140 according one or more embodiments may identify an object included in an image received from the camera.

Here, the object may include obstacles of various forms associated with the movement pattern of the robot device 200 such as walls, furniture, home appliances, humans, pets, and the like.

According to an embodiment, the at least one processor 140 may identify a movement pattern that corresponds to an object. For example, the at least one processor 140 may identify a pattern of moving by following an object when walls, furniture, home appliances, and the like are identified based on the plurality of clusters, and identify a pattern of moving by avoiding an object when humans, pets, books, small appliances, toys, clothing, and the like are identified.

According to an embodiment, the at least one processor 140 may identify, based on the obtained movement pattern and a movement pattern that corresponds to an object being different, the operating state as the abnormal operation.

Referring back to FIG. 2, the sensor 120 according to one or more embodiments may include a microphone.

The at least one processor 140 according to one or more embodiments may identify the first distance between the air conditioner 100-1 and the robot device 200 based on a magnitude of sound (or, sound output by the robot device 200; e.g., sensing data) according to an operation of the robot device 200 received through the microphone.

In addition, the air purifier 100-2 within the household may identify the second distance between the air purifier 100-2 and the robot device 200 based on a magnitude of sound received from the robot device 200, and the display device 100-3 may also identify the third distance between the display device 100-3 and the robot device 200 based on a magnitude of sound received from the robot device 200.

According to an embodiment, the air conditioner 100-1 may receive the second distance from the air purifier 100-2, and receive the third distance from the display device 100-3. Then, the air conditioner 100-1 may identify the position of the robot device 200 based on the first distance identified by the air conditioner 100-1, the second distance received from the air purifier 100-2, and the third distance received from the display device 100-3.

According to an embodiment, the at least one processor 140 may identify the position of the robot device 200 at the t time point according to the trilateration (True-range multilateration) method based on the position of the air conditioner 100-1 (first reference point), the position of the air purifier 100-2 (second reference point), the position of the display device 100-3 (third reference point), and the first to third distances 1, 2, and 3.

According to an embodiment, the at least one processor 140 may identify the position of the robot device 200' at the t+1 time point.

According to an embodiment, the at least one processor 140 may obtain a movement pattern of the robot device 200 based on the position of the robot device 200 at the t time point and the position of the robot device 200' at the t+1 time point.

Figure 13:
FIG. 13 is a diagram illustrating a user terminal device providing a notification according to one or more embodiments.

FIG. 13 is a diagram illustrating a user terminal device providing a notification according to one or more embodiments.

Referring to FIG. 13, the electronic apparatus 100 according to one or more embodiments may provide, based on the operating state of the robot device 200 being identified as the abnormal operation, a notification to a user terminal device.

In addition, the electronic apparatus 100 may provide, based on the operating state of the robot device 200 being identified as the abnormal operation, at least one from among a sound feedback or a visual feedback. For example, the electronic apparatus 100 may output a sound indicating that the robot device 200 is in the abnormal operation through a speaker (not shown), or output a screen indicating that the robot device 200 is in the abnormal operation through a display (not shown).

Figure 14:
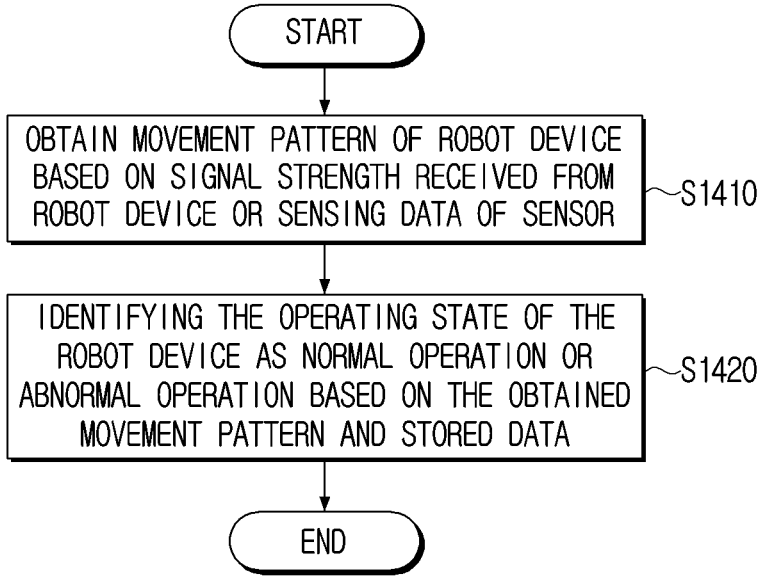
FIG. 14 is a flowchart illustrating a controlling method of an electronic apparatus according to one or more embodiments.

FIG. 14 is a flowchart illustrating a controlling method of an electronic apparatus according to one or more embodiments. The electronic apparatus may include a memory storing data including the plurality of movement patterns corresponding to the normal operation of the robot device.

According to an embodiment, in operation S1410, the controlling method may include obtaining a movement pattern of the robot device based on a signal strength received from the robot device or sensing data from the sensor. However, the disclosure is not limited thereto, and as such, the movement pattern of the robot device may be obtained in a different manner.

According to an embodiment, in operation S1420, the method may include identifying the operating state of the robot device as the normal operation or the abnormal operation based on the obtained movement pattern and the data including the plurality of movement patterns corresponding to the normal operation of the robot device.

Here, the controlling method may further include obtaining the plurality of clusters by classifying the plurality of movement patterns, and the identifying operation S1420 may include identifying, based on a cluster corresponding to the obtained movement pattern being identified from among the plurality of clusters, the operating state according to the obtained movement pattern as the normal operation and identifying, based on a cluster corresponding to the obtained movement pattern not being identified from among the plurality of clusters, the operating state according to the obtained movement pattern as the abnormal operation.

Here, the obtaining the plurality of clusters may include obtaining, based on the plurality of movement patterns being received from the external electronic apparatus, the plurality of clusters that correspond to the normal operation by coordinating the received plurality of movement patterns and the plurality of movement patterns included in the electronic apparatus, and the identifying operation S1420 may include identifying, based on a cluster corresponding to the obtained movement pattern being identified from among the plurality of clusters that correspond to the normal operation, the operating state according to the obtained movement pattern as the normal operation and identifying, based on a cluster corresponding to the obtained movement pattern not being identified from among the plurality of clusters that correspond to the normal operation, the operating state according to the obtained movement pattern as the abnormal operation.

The identifying operation S1420 according to an example of the disclosure may include identifying the operating state as the normal operation or the abnormal operation by inputting the obtained movement pattern to a trained neural network model, and the trained neural network model may be a model trained to identify the operating state according to the obtained movement pattern as the normal operation or the abnormal operation based on the plurality of movement patterns corresponding to the normal operation included in the data.

The obtaining operation S1410 according to an example of the disclosure may include identifying a change in first distance between the electronic apparatus and the robot device based on the signal strength, identifying a change in position of the robot device based on the change in first distance and a change in second distance between the external electronic apparatus and the robot device received from the external electronic apparatus, and obtaining a movement pattern according to the change in position, and the change in position of the robot device may include a change in coordinates of the robot device within a space at which the robot device is positioned.

The obtaining operation S1410 according to an example of the disclosure may include identifying the change in first distance between the electronic apparatus and the robot device based on first sensing data received from the sensor, identifying the change in second distance between the external electronic apparatus and the robot device based on second sensing data received from the external electronic apparatus, identifying the change in position of the robot device based on the change in first distance and the change in second distance, and obtaining the movement pattern according to the change in position.

Here, the second may include the microphone, the first sensing data may include a magnitude of sound that the robot device outputs received through the microphone, and the second sensing data may include a magnitude of sound that the robot device outputs received through the microphone provided in the external electronic apparatus.

The sensor according to an example may include a camera, and the obtaining operation S1410 may include obtaining a movement pattern of the robot device based on an image received from the camera.

The obtaining operation S1410 according to an example may include identifying an object included in an image and identifying a movement pattern that corresponds to an object, and the identifying operation S1420 may include identifying, based on the movement pattern of the robot device being different from the movement pattern that corresponds to an object, the operating state as the abnormal operation, and the movement pattern that corresponds to an object may include a movement pattern for the robot device to avoid an object.

However, the various embodiments of the disclosure may not only be applied to the electronic apparatus, but also to home appliances of various types.

The various embodiments described above may be realized in a recordable medium which is readable by computer or a device similar to the computer using a software, a hardware, or a combination of the software and hardware. In some cases, the embodiments described herein may be realized with the processor on its own. According to a software implementation, embodiments such as the procedures and functions described herein may be realized with separate software modules. Each of the software modules may perform at least one function and operation described herein.

Computer instructions for performing processing operations in the electronic apparatus according to the various embodiments described above may be stored in a non-transitory computer-readable medium. The computer instructions stored in this non-transitory computer-readable medium may cause a specific device to perform a processing operation in the electronic apparatus 100 according to the above-described various embodiments when executed by a processor of the specific device.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

While one or more example embodiments of the disclosure has been illustrated and described above, the disclosure is not limited to a specific embodiment described above, and it will be understood by those skilled in the art that various changes in form and details may be made therein without departing from the true spirit and full scope of the disclosure, including the appended claims and their equivalents.

What is claimed is:

1. An electronic apparatus, comprising:
a communication interface configured to receive a beacon from a robot device via a direct communication;
a sensor;
a memory stored with data comprising a plurality of stored movement patterns corresponding to a normal operation of the robot device; and
at least one processor electrically coupled with the memory and configured to cause the electronic apparatus to perform operations to:
obtain a movement pattern of the robot device based on at least one of a plurality of first distances between the electronic apparatus and the robot device or sensing data from the sensor,
identify an operating state of the robot device as the normal operation based on a match between the obtained movement pattern and at least one stored movement pattern among the plurality of stored movement patterns;
identify the operating state of the robot device as an abnormal operation based on a mismatch between the obtained movement pattern and all of the plurality of stored movement patterns; and
output an alarm indicating that the robot device is operating abnormally based on the operating state of the robot device being the abnormal operation,
wherein the plurality of first distances between the electronic apparatus and the robot device is obtained based on a signal strength of the beacon measured at a plurality of intervals.

2. The electronic apparatus of claim 1, wherein the at least one processor is further configured to:
obtain a plurality of clusters by classifying the plurality of stored movement patterns,
identify the operating state of the robot device as the normal operation based on match between a cluster corresponding to the obtained movement pattern and one of the plurality of clusters, and
identify the operating state of the robot device as the abnormal operation based on no match between the cluster corresponding to the obtained movement pattern and one of the plurality of clusters.

3. The electronic apparatus of claim 2, wherein the at least one processor is further configured to:
obtain, based on a plurality of received movement patterns being received from an external electronic apparatus through the communication interface, a plurality of clusters that correspond to a normal operation by coordinating the plurality of received movement patterns and the plurality of stored movement patterns stored in the memory.

4. The electronic apparatus of claim 1, wherein the at least one processor is further configured to:
identify the operating state as the normal operation or the abnormal operation by inputting the obtained movement pattern in a trained neural network model, and
wherein the trained neural network model is a model trained to identify the operating state according to the obtained movement pattern as the normal operation or the abnormal operation based on the plurality of stored movement patterns corresponding to the normal operation in the data.

5. The electronic apparatus of claim 1, wherein the at least one processor is further configured to:
obtain a plurality of second distances between an external electronic apparatus and the robot device from the external electronic apparatus through the communication interface, and
obtain the movement pattern further based on the plurality of second distances, and
wherein the plurality of first distances or the plurality of second distances indicates a change in coordinates of the robot device within a space at which the robot device is positioned.

6. The electronic apparatus of claim 1, wherein the at least one processor is further configured to:
identify a change in the plurality of first distances between the electronic apparatus and the robot device based on first sensing data received from the sensor,
identify a change in a plurality of second distances between an external electronic apparatus and the robot device based on second sensing data received from the external electronic apparatus through the communication interface,
identify a change in position of the robot device based on the change in the plurality of first distances and the change in the plurality of second distances, and
obtain the movement pattern according to the change in position.

7. The electronic apparatus of claim 6, wherein the sensor comprises a microphone,
wherein the first sensing data comprises a magnitude of sound output by the robot device received through the microphone, and
wherein the second sensing data comprises the magnitude of sound output by the robot device received through another microphone provided in the external electronic apparatus.

8. The electronic apparatus of claim 1,
wherein the sensor comprises a camera, and
wherein the at least one processor is further configured to
    obtain the movement pattern of the robot device based
    on an image received from the camera.

9. The electronic apparatus of claim 8,
wherein the at least one processor is further configured to:
    identify an object from the image,
        identify a movement pattern corresponding to the
        object, and
        identify, based on the movement pattern of the robot
        device being different from a movement pattern
        corresponding to the object, the operating state as the
        abnormal operation, and
    wherein the movement pattern corresponding to the object
    comprises a movement pattern for the robot device to
    avoid the object.

10. The electronic apparatus of claim 8, wherein
the at least one processor is further configured to:
    determine a color displayed by the robot device from
    the image captured by the camera;
        identify the operating state as the normal operation,
        based on a determination that the robot device is
        displaying a first color; and
        identify the operating state as the abnormal operation,
        based on a determination that the robot device is
        displaying a second color.

11. The electronic apparatus of claim 1, wherein the at
least one processor is further configured to provide, based on
the operating state being identified as the abnormal opera-
tion, a notification indicating the operating state of the robot
device to a user terminal device through the communication
interface.

12. A control method for an electronic apparatus including
a memory storing data including a plurality of stored move-
ment patterns corresponding to a normal operation of a robot
device, the method comprising:
    causing the electronic apparatus to perform operations
        comprising:
    receiving, through a communication interface of the elec-
        tronic apparatus, a beacon from the robot device via a
        direct communication;
    obtaining a movement pattern of the robot device based
        on at least one of a plurality of first distances between
        the electronic apparatus and the robot device or sensing
        data of a sensor;
    identifying an operating state of the robot device as a
        normal operation based on a match between the
        obtained movement pattern and at least one stored
        movement pattern among the plurality of stored move-
        ment patterns;
    identifying the operating state of the robot device as an
        abnormal operation based on a mismatch between the
        obtained movement pattern and all of the plurality of
        stored movement patterns; and
    outputting an alarm indicating that the robot device is
        operating abnormally based on the operating state of
        the robot device being the abnormal operation,
    wherein the plurality of first distances between the elec-
        tronic apparatus and the robot device is obtained based
        on a signal strength of the beacon measured at a
        plurality of intervals.

13. The method of claim 12, further comprises: obtaining
a plurality of clusters by classifying the plurality of stored
movement patterns, and wherein the identifying comprises:
    identifying the operating state of the robot device as the
        normal operation based on match between a cluster
        corresponding to the obtained movement pattern and
        one of the plurality of clusters, and
    identifying the operating state of the robot device as the
        abnormal operation based on no match between the
        cluster corresponding to the obtained movement pat-
        tern and one of the plurality of clusters.

14. The method of claim 13, wherein
the obtaining the plurality of clusters comprises:
    obtaining, based on a plurality of received movement
        patterns being received from an external electronic
        apparatus, a plurality of clusters that correspond to a
        normal operation by coordinating the plurality of
        received movement patterns and a plurality of stored
        movement patterns comprised in the electronic appa-
        ratus.

15. The method of claim 12, wherein the identifying
comprises:
    identifying the operating state as the normal operation and
        the abnormal operation by inputting the obtained move-
        ment pattern in a trained neural network model, and
    wherein the trained neural network model is a model
        trained to identify the operating state according to the
        obtained movement pattern as the normal operation or
        the abnormal operation based on the plurality of stored
        movement patterns corresponding to the normal opera-
        tion comprised in the data.

16. The method of claim 12, wherein the obtaining
comprises:
    obtaining a plurality of second distances between an
        external electronic apparatus and the robot device from
        the external electronic apparatus through the commu-
        nication interface of the electronic apparatus, and
    obtaining the movement pattern further based on the
        plurality of second distances, and
    wherein the plurality of first distances or the plurality of
        second distances indicates a change in coordinates of
        the robot device within a space at which the robot
        device is positioned.

17. The method of claim 12, wherein the obtaining
comprises:
    identifying a change in the plurality of first distances
        between the electronic apparatus and the robot device
        based on first sensing data received from the sensor,
    identifying a change in a plurality of second distances
        between an external electronic apparatus and the robot
        device based on second sensing data received from the
        external electronic apparatus through the communica-
        tion interface,
    identifying a change in position of the robot device based
        on the change in the plurality of first distances and the
        change in the plurality of second distances, and
    obtaining the movement pattern according to the change
        in position.

18. The method of claim 17, wherein the sensor comprises
a microphone,
    wherein the first sensing data comprises a magnitude of
        sound output by the robot device received through the
        microphone, and
    wherein the second sensing data comprises the magnitude
        of sound output by the robot device received through
        another microphone provided in the external electronic
        apparatus.

19. The method of claim 12, wherein the sensor comprises a camera, and wherein the obtaining comprises obtaining the movement pattern of the robot device based on an image received from the camera.

20. A non-transitory computer readable recording medium comprising a program for executing a control method for an electronic apparatus including a memory storing data including a plurality of stored movement patterns corresponding to a normal operation of a robot device, the method comprising:

causing the electronic apparatus to perform operations comprising:

receiving, through a communication interface of the electronic apparatus, a beacon from a robot device via a direct communication;

obtaining a movement pattern of the robot device based on at least one of a plurality of first distances between the electronic apparatus and the robot device or sensing data of a sensor;

identifying an operating state of the robot device as a normal operation based on a match between the obtained movement pattern and at least one stored movement pattern among the plurality of stored movement patterns;

identifying the operating state of the robot device as an abnormal operation based on a mismatch between the obtained movement pattern and all of the plurality of stored movement patterns; and outputting an alarm indicating that the robot device is operating abnormally based on the operating state of the robot device being the abnormal operation, wherein the plurality of first distances between the electronic apparatus and the robot device is obtained based on a signal strength of the beacon measured at a plurality of intervals.

* * * * *